United States Patent

Wadas et al.

[11] Patent Number: 5,989,155
[45] Date of Patent: Nov. 23, 1999

[54] ENGINE FUEL CONTROL FOR COMPLETING SHIFTS IN CONTROLLER-ASSISTED, MANUALLY SHIFTED TRANSMISSION

[75] Inventors: David L. Wadas, Kalamazoo; Sharon L. Gualtieri, Schoolcraft, both of Mich.

[73] Assignee: Eaton Corporation, Cleveland, Ohio

[21] Appl. No.: 09/053,092

[22] Filed: Apr. 1, 1998

[51] Int. Cl.⁶ .................................................. B60K 41/04
[52] U.S. Cl. .............................. 477/111; 477/121; 701/58
[58] Field of Search ..................................... 477/109, 111, 477/121; 701/54, 62, 58

[56] References Cited

U.S. PATENT DOCUMENTS

| | | |
|---|---|---|
| 4,754,665 | 7/1988 | Vandervoort . |
| 4,920,815 | 5/1990 | Reynolds . |
| 4,974,468 | 12/1990 | Reynolds et al. . |
| 5,000,060 | 3/1991 | Reynolds et al. . |
| 5,222,404 | 6/1993 | Stine . |
| 5,370,013 | 12/1994 | Reynolds et al. . |
| 5,390,561 | 2/1995 | Stine . |
| 5,441,464 | 8/1995 | Markyvech .......................... 477/111 X |
| 5,517,411 | 5/1996 | Genise et al. .............................. 701/53 |
| 5,533,946 | 7/1996 | Markyvech .......................... 477/124 X |
| 5,582,558 | 12/1996 | Palmeri et al. . |
| 5,651,292 | 7/1997 | Genise . |
| 5,735,771 | 4/1998 | Genise .................................... 477/111 |
| 5,755,639 | 5/1998 | Genise et al. ........................... 477/111 |

*Primary Examiner*—Dirk Wright
*Assistant Examiner*—Peter T. Kwon
*Attorney, Agent, or Firm*—Howard D. Gordon

[57] ABSTRACT

A control for enhanced manual shifting in a computer (48) -assisted vehicular compound transmission having a main section (16A) shifted by a manually operated shift lever (31) and an engine fuel controller (36). Engine fueling will be in accordance with the operator-set throttle pedal position (THL) unless the control logic determines that such fueling will prevent acceptable engagement of a target gear ratio ($GR_T$), in which case engine fueling will be automatically controlled to complete the shift.

18 Claims, 6 Drawing Sheets

ENGINE FUEL CONTROL FOR COMPLETING SHIFTS IN CONTROLLER-ASSISTED, MANUALLY SHIFTED TRANSMISSION

RELATED APPLICATIONS

This application is related to the following co-pending applications, all assigned to EATON CORPORATION, the assignee of this application:

Ser. No. 08/053,089 mailed Apr. 1, 1998 and titled RANGE SHIFT CONTROL

Ser. No. 08/053,090 mailed Apr. 1, 1998 and titled ADAPTIVE UPSHIFT JAW CLUTCH ENGAGEMENT CONTROL Ser. No. 08/053,092 mailed Apr. 1, 1998 and titled ADAPTIVE NEUTRAL SENSING Ser. No. 08/053,095 mailed Apr. 1, 1998 and titled DYNAMIC RANGE SHIFT ACTUATION Ser. No. 08/053,091 mailed Apr. 1, 1998 and titled JAW CLUTCH ENGAGEMENT CONTROL FOR ASSISTED, MANUALLY SHIFTED, SPLITTER-TYPE TRANSMISSION SYSTEM Ser. No. 08/053,181 mailed Apr. 1, 1998 and titled ADAPTIVE SPLITTER ACTUATOR ENGAGEMENT FORCE CONTROL Ser. No. 08/902,603 filed Aug. 7, 1997 and titled PARTIALLY AUTOMATED, LEVER-SHIFTED MECHANICAL TRANSMISSION SYSTEM Ser. No. 08/990,678 mailed Dec. 11, 1997 and titled ASSISTED LEVER-SHIFTED TRANSMISSION.

BACKGROUND OF THE INVENTION

1. Field of the Invention

The present invention relates to a controller-assisted, manually shifted vehicular transmission system having an engine controller for controlling engine fueling in response to command signals. The controller normally will fuel the engine in accordance with the operator's throttle pedal position, but will override the operator if it is determined that assistance is required to complete a shift. In particular, the present invention relates to logic rules for controlling a transmission system of the type described, including determining when the operator's throttle setting is so inappropriate for completing a shift, such as a splitter shift, into a target gear ratio that the engine controller should override the operator and fuel the engine in a predetermined manner, regardless of throttle pedal position.

2. Description of the Prior Art

Compound manually shifted mechanical transmissions of the range, splitter and/or combined range/splitter type are in wide use in heavy-duty vehicles and are well known in the prior art, as may be seen by reference to U.S. Pat. Nos. 4,754,665; 5,272,929; 5,370,013 and 5,390,561, 5,546,823; 5,609,062 and 5,642,643, the disclosures of which are incorporated herein by reference. Typically, such transmissions include a main section shifted directly or remotely by a manual shift lever and one or more auxiliary sections connected in series therewith. The auxiliary sections most often were shifted by a slave actuator, usually pneumatically, hydraulically, mechanically and/or electrically operated, in response to manual operation of one or more master switches. Shift controls for such systems by be seen by reference to U.S. Pat. Nos. 4,455,883; 4,550,627; 4,899,607; 4,920,815; 4,974,468; 5,000,060; 5,272,931; 5,281,902; 5,222,404 and 5,350,561, the disclosures of which are incorporated herein by reference.

Fully or partially automated transmission systems wherein a microprocessor-based electronic control unit (ECU) receives input signals indicative of various system operating conditions and processes same according to logic rules to issue command output signals to one or more system actuators are known in the prior art, as may be seen by reference to U.S. Pat. Nos. 4,361,060; 4,593,580; 4,595,986; 4,850,236; 5,435,212; 5,582,069; 5,582,558; 5,620,392; 5,651,292 and 5,679,096; 5,682,790; the disclosures of which are incorporated herein by reference.

Prior art manually shifted vehicular transmission systems, including computer-assisted systems, are subject to improvement, as (i) the best pneumatic, hydraulic, electric or mechanical clutch engagement systems can be defeated if the driver does not get the engine to the proper synchronous speed and/or (ii) drivers do not like not being in control of engine fueling. In an upshift, if a driver reapplies fuel too early (prior to the jaw clutch engaging), the shift is missed because the application of fuel and subsequent engine speed increase drive the engine speed away from the desired synchronous speed, or if the engine deceleration is rapid, the clutch may not engage because the system passes through synchronous too quickly. In a downshift, if the driver does not apply enough fuel on the downshift to raise the engine speed to synchronous speed, the clutch does not engage, or if the driver applies too much fuel, the engine accelerates past the desired synchronous speed and the clutch does not engage. Excessive occurrences and lengthy duration of engine fueling not tracking throttle position also are objectionable to the vehicle driver.

SUMMARY OF THE INVENTION

A preferred embodiment of the present invention involves a computer-assisted mechanical compound transmission system wherein the main section is shifted by a manually controlled shift lever and the engine is fueled and/or the auxiliary sections are shifted by actuators at least partially controlled by an ECU to enhance shifting. The ECU uses sensed and/or calculated inputs indicative of system operating parameters, such as operation of a splitter switch and/or a range switch, position and/or rate of change of position of the shift lever, engaged gear ratio, engine speed, output shaft speed, clutch condition and/or throttle pedal position, to assist shifting by controlling engine fueling and/or operation of the range and/or splitter shift actuators.

In accordance with the present invention, the drawbacks of the prior art are minimized or overcome by the provision of a control method/system that includes logic rules or an algorithm using a number of inputs to determine if the driver is not responding in a manner that will allow the target ratio jaw clutch to engage. When this condition is identified, the algorithm (preferably through the SAE J-1939 communications link) overrides the driver's actions and controls the engine so the shift can be completed.

The algorithm has been designed to intervene only when the driver's actions are determined to interfere with completion of the shift. In a preferred embodiment, this logic is applied only to completion of splitter shifts, although the invention is not so limited.

In a preferred embodiment, on upshifts, the system uses input speed, output speed and throttle pedal demand to determine if it should evoke automatic engine fuel control. On a downshift, the system uses a combination of throttle pedal demand, engine acceleration, output shaft speed and engine speed to determine if automatic engine fuel control should be invoked.

Preferably, on downshifts, the control looks at acceleration rate of the vehicle (rate of change of output shaft speed) and proximity to maximum engine speed ($ES_{MAX}$) to determine if automatic engine fuel control should be invoked and/or on range downshifts, if the driver engages the main transmission section well out of synchronous, automatic engine control is invoked immediately to insure that the range clutch engages.

Accordingly, it is an object of the present invention to provide ECU assistance for enhanced shifting of a mechanical compound transmission having a main section shifted by a manually operated shift lever.

This and other objects and advantages of the present invention will become apparent from a reading of the following description of the preferred embodiment taken in connection with the attached drawings.

DESCRIPTION OF THE PREFERRED EMBODIMENT

Figure 1:
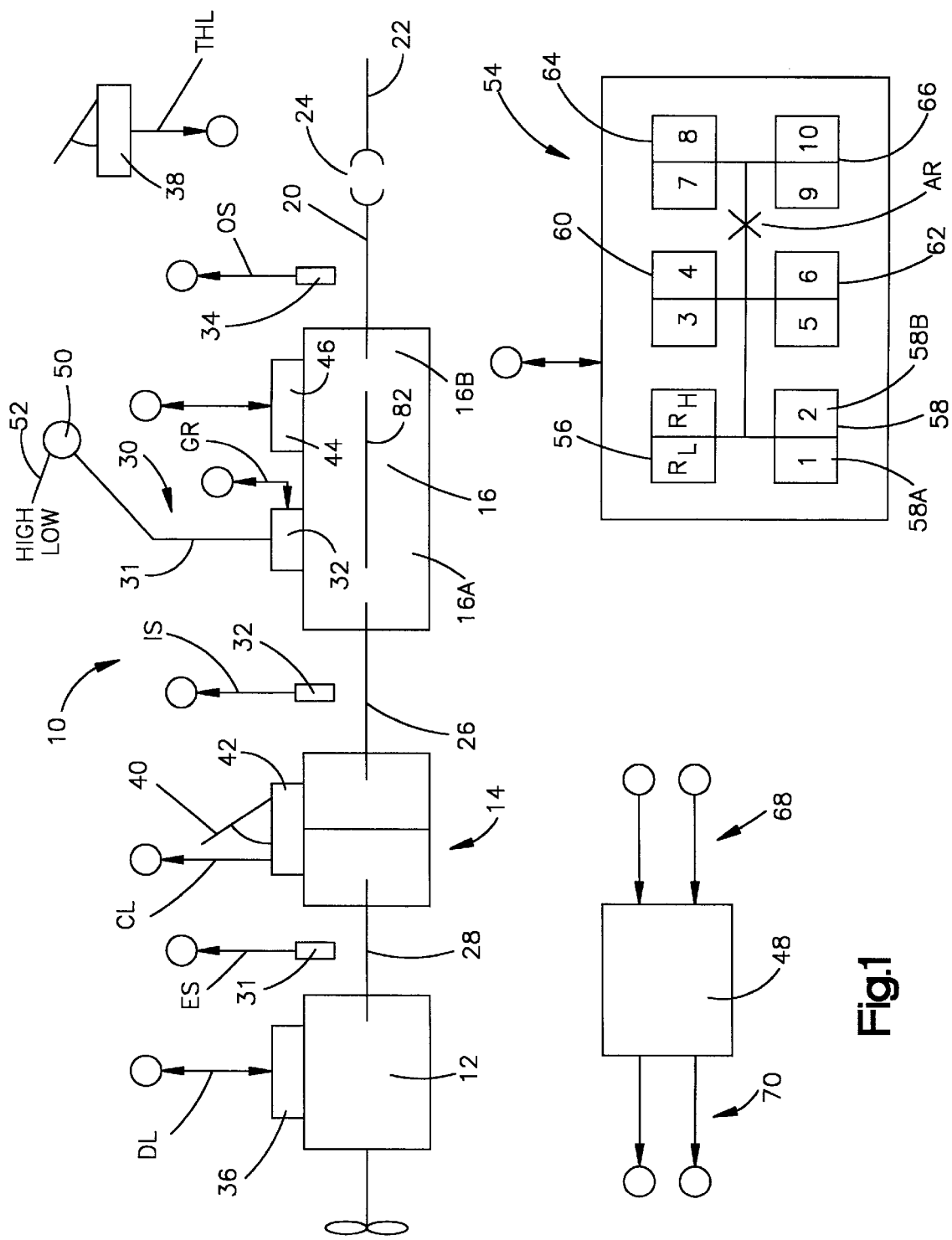
FIG. 1 is a schematic illustration of an ECU-assisted compound mechanical transmission system advantageously utilizing the engine control techniques of the present invention.

A computer-assisted (i.e., microprocessor-based, controller-assisted) vehicular compound mechanical transmission system 10, particularly well suited to utilize the engine fueling control of the present invention, may be seen by reference to FIGS. 1–5B.

System 10 is of the type commonly utilized in heavy-duty vehicles, such as the conventional tractors of tractor/semi-trailer vehicles, and includes an engine, typically a diesel engine 12, a master friction clutch 14 contained within a clutch housing, a multiple-speed compound transmission 16, and a drive axle assembly (not shown). The transmission 16 includes an output shaft 20 drivingly coupled to a vehicle drive shaft 22 by a universal joint 24 for driving the drive axle assembly. The transmission 16 is housed within a transmission housing to which is directly mounted the shift tower of the shift lever assembly 30. The present system is equally applicable to remotely mounted shift levers, as are used in cab-over-engine types of vehicles.

Figure 2:
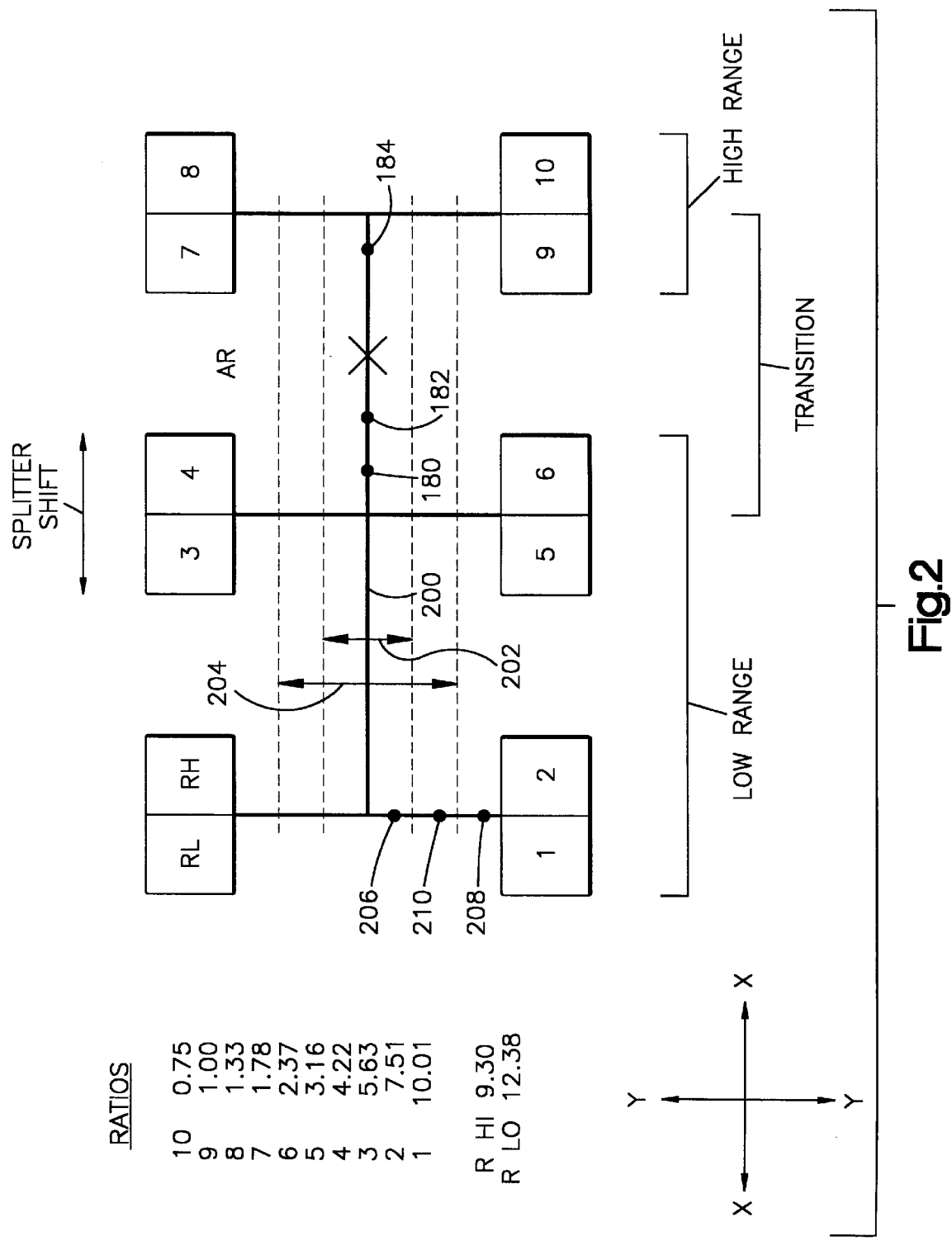
FIG. 2 is a chart illustrating the shift pattern and representative numerical ratios for the transmission of FIG. 1.

FIG. 2 illustrates a shift pattern for assisted manual shifting of a combined range-and-splitter-type compound transmission shifted by a manually operated shift lever. Briefly, the shift lever 31 is movable in the side-to-side or X—X direction to select a particular ratio or ratios to be engaged and is movable in the fore and aft or Y—Y direction to selectively engage and disengage the various ratios. The shift pattern may include an automatic range shifting feature and automatically selected and/or implemented splitter shifting, as is known in the prior art. Manual transmissions utilizing shift mechanisms and shift patterns of this type are well known in the prior art and may be appreciated in greater detail by reference to aforementioned U.S. Pat. Nos. 5,000,060 and 5,390,561.

Typically, the shift lever assembly 30 will include a shift finger or the like (not shown) extending downwardly into a shifting mechanism 32, such as a multiple-rail shift bar housing assembly or a single shift shaft assembly, as is well known in the prior art and as is illustrated in aforementioned U.S. Pat. Nos. 4,455,883; 4,550,627; 4,920,815 and 5,272,931.

In the automatic range shifting feature, as the shift lever moves in the transition area between the middle leg (3/4–5/6) and the righthand leg (7/8–9/10) of the shift pattern, it will cross a point, AR, which will actuate a mechanical or electrical range switch, or will be sensed by a position sensor, to cause automatic implementation of a range shift.

Shifting of transmission 16, comprising main section 16A coupled in series to auxiliary section 16B, is semi-automatically implemented/assisted by the vehicular transmission system 10, illustrated in FIGS. 1–5B. Main section 16A includes an input shaft 26, which is operatively coupled to the drive or crank shaft 28 of the vehicle engine 12 by master clutch 14, and output shaft 20 of auxiliary section 16B is operatively coupled, commonly by means of a drive shaft 24, to the drive wheels of the vehicle. The auxiliary section 16B is a splitter type, preferably a combined range-and-splitter type, as illustrated in U.S. Pat. Nos. 4,754,665 and 5,390,561.

The change-gear ratios available from main transmission section 16 are manually selectable by manually positioning the shift lever 31 according to the shift pattern prescribed to engage the particular desired change-gear ratio of main section 16A.

The system may include sensors 30 (for sensing engine rotational speed (ES)), 32 (for sensing input shaft rotational speed (IS)), and 34 (for sensing output shaft rotational speed (OS)), and providing signals indicative thereof. As is known, with the clutch 14 (i.e., no slip) engaged and the transmission engaged in a known gear ratio, ES=IS=OS*GR (see U.S. Pat. No. 4,361,060). Accordingly, if clutch 14 is engaged, engine speed and input shaft speed may be considered as equal. Input shaft speed sensor 32 may be eliminated and engine speed (ES), as sensed by a sensor or over a data link (DL), substituted therefor.

Engine 12 is electronically controlled, including an electronic controller 36 communicating over an electronic data link (DL) operating under an industry standard protocol such as SAE J-1922, SAE J-1939, ISO 11898 or the like. Throttle position (operator demand) is a desirable parameter for selecting shifting points and in other control logic. A separate throttle position sensor 38 may be provided or throttle position (THL) may be sensed from the data link. Gross engine torque ($T_{EG}$) and base engine friction torque ($T_{BEF}$) also are available on the data link.

A manual clutch pedal 40 controls the master clutch 14, and a sensor 42 provides a signal (CL) indicative of clutch-engaged or -disengaged condition. The condition of the clutch also may be determined by comparing engine speed to input shaft speed if both signals are available. An auxiliary section actuator 44 including a range shift actuator and a splitter actuator 46 is provided for operating the range clutch and the splitter section clutch in accordance with command output signals from ECU 48. The shift lever 31 has a knob 50 which contains splitter selector switch 52 by which a driver's intent to initiate a splitter shift may be sensed.

System 10 may include a driver's display unit 54 including a graphic representation of the six-position shift pattern with individually lightable display elements 56, 58, 60, 62, 64 and 66, representing each of the selectable engagement positions. Preferably, each half of the shift pattern display elements (i.e., 58A and 58B) will be individually lightable, allowing the display to inform the driver of the lever and splitter position for the engaged ratio.

The system includes a control unit or ECU 48, preferably a microprocessor-based control unit of the type illustrated in U.S. Pat. Nos. 4,595,986; 4,361,065 and 5,335,566, the disclosures of which are incorporated herein by reference, for receiving input signals 68 and processing same according to predetermined logic rules to issue command output signals 70 to system actuators, such as the splitter section actuator 46, the engine controller 36, the range shift actuator and/or the display unit 54. A separate system controller may be utilized, or the engine controller ECU 36 communicating over an electronic data link may be utilized.

As shown in U.S. Pat. No. 5,651,292 (the disclosure of which is incorporated herein by reference) and co-pending patent application U.S. Ser. No. 08/597,304 (assigned to the assignee of this application), the splitter actuator 46 is, preferably, a three-position device, allowing a selectable and maintainable splitter section neutral. Alternatively, a "pseudo" splitter-neutral may be provided by deenergizing the splitter actuator when the splitter clutch is in an intermediate, non-engaged position.

Figure 3:
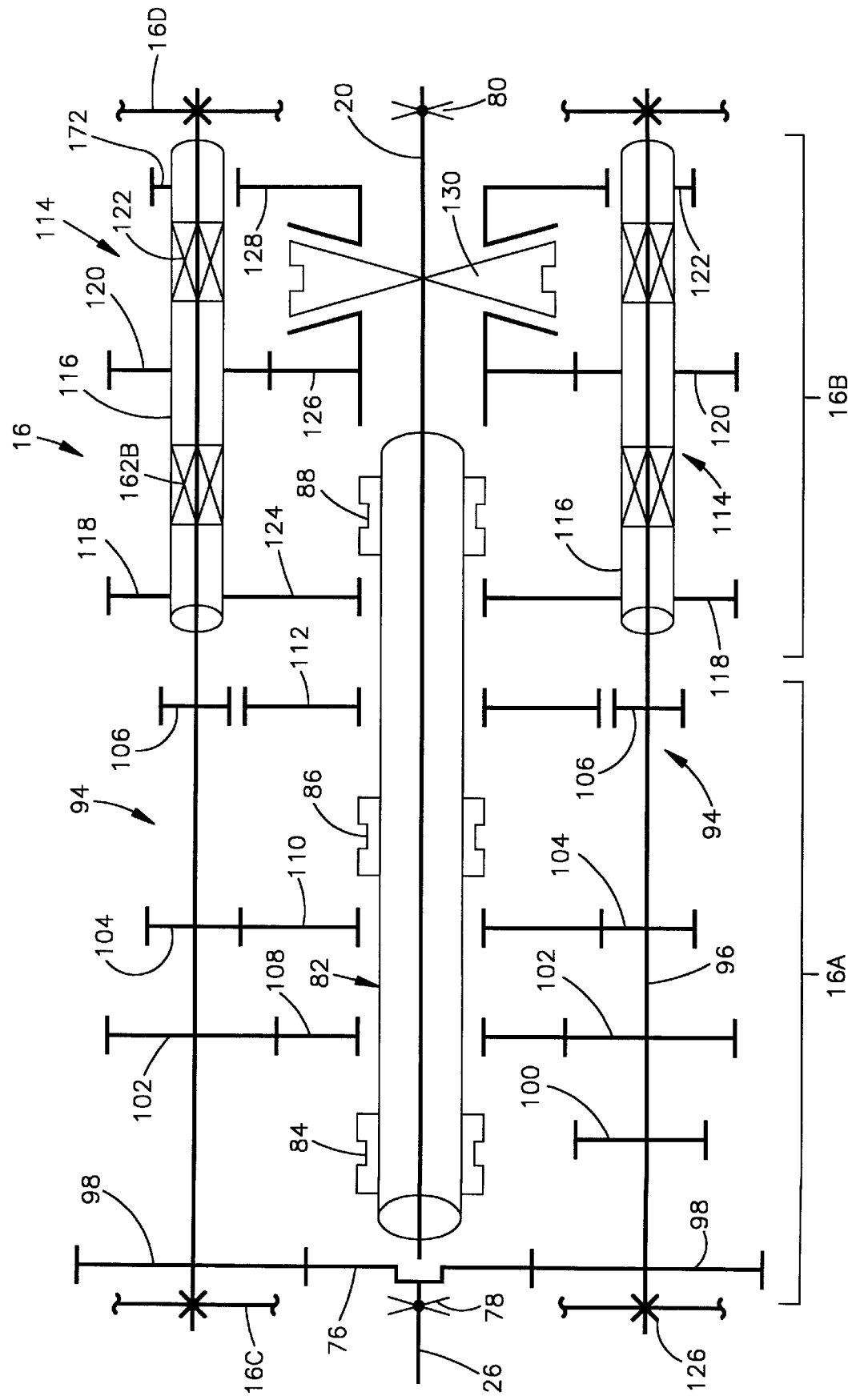
FIG. 3 is a schematic illustration of the structure of the compound mechanical transmission of FIG. 1.

The structure of the 10-forward-speed combined range-and-splitter-type transmission 16 is schematically illustrated in FIG. 3. Transmissions of this general type are disclosed in aforementioned U.S. Pat. Nos. 5,000,060; 5,370,013 and 5,390,561.

Transmission 16 includes a main section 16A and an auxiliary section 16B, both contained within a housing including a forward end wall 16C, which may be defined by the clutch housing, and a rearward end wall 16D, but (in this particular embodiment) not an intermediate wall.

Input shaft 26 carries input gear 76 fixed for rotation therewith and defines a rearwardly opening pocket wherein a reduced diameter extension of output shaft 20 is piloted. A non-friction bushing or the like may be provided in the pocket or blind bore. The rearward end of input shaft 26 is supported by bearing 78 in front end wall 16C, while the rearward end of output shaft 20 is supported by bearing assembly 80 in rear end wall 16D.

The mainshaft 82, which carries mainshaft clutches 84 and 86, and the mainshaft splitter clutch 88 is in the form of a generally tubular body having an externally splined outer surface and an axially extending through bore for passage of output shaft 20. Shift forks 90 and 92 are provided for shifting clutches 84 and 86, respectively (see FIG. 5A). Mainshaft 82 is independently rotatable relative to input shaft 26 and output shaft 20 and preferably is free for limited radial movement relative thereto.

The main section 16A includes two substantially identical main section countershaft assemblies 94, each comprising a main section countershaft 96 carrying countershaft gears 98, 100, 102, 104 and 106 fixed thereto. Gear pairs 98, 100, 102, 104 and 106 are constantly meshed with input gear 76, mainshaft gears 108 and 110 and an idler gear (not shown), which is meshed with reverse mainshaft gear 112, respectively.

Main section countershaft 96 extends rearwardly into the auxiliary section, where its rearward end is supported directly or indirectly in rear housing end wall 16D.

The auxiliary section 16B of transmission 16 includes two substantially identical auxiliary countershaft assemblies 114, each including an auxiliary countershaft 116 carrying auxiliary countershaft gears 118, 120 and 122 for rotation therewith. Auxiliary countershaft gear pairs 118, 120 and 122 are constantly meshed with splitter gear 124, splitter/range gear 126 and range gear 128, respectively. Splitter clutch 88 is fixed to mainshaft 82 for selectively clutching either gear 124 or 126 thereto, while synchronized range clutch 130 is fixed to output shaft 20 for selectively clutching either gear 126 or gear 128 thereto.

Auxiliary countershafts 116 are generally tubular in shape, defining a through bore for receipt of the rearward extensions of the main section countershafts 96. Bearings or bushings are provided to rotatably support auxiliary countershaft 116 on main section countershaft 96.

The splitter jaw clutch 88 is a double-sided, non-synchronized clutch assembly which may be selectively positioned in the rightwardmost or leftwardmost positions for engaging either gear 126 or gear 124, respectively, to the mainshaft 82 or to an intermediate position wherein neither gear 124 or 126 is clutched to the main shaft. Splitter jaw clutch 88 is axially positioned by means of a shift fork 98 controlled by a three-position actuator, such as a piston actuator, which is responsive to a driver selection switch such as a button or the like on the shift knob, as is known in the prior art and to control signals from ECU 48 (see U.S. Pat. No. 5,661,998). Two-position synchronized range clutch assembly 130 is a two-position clutch which may be selectively positioned in either the rightwardmost or leftwardmost positions thereof for selectively clutching either gear 128 or 126, respectively, to output shaft 20. Clutch assembly 130 is positioned by means of a shift fork (not shown) operated by means of a two-position piston device. Either piston actuator may be replaced by a functionally equivalent actuator, such as a ball screw mechanism, ball ramp mechanism or the like.

By selectively axially positioning both the splitter clutch 88 and the range clutch 130 in the forward and rearward axial positions thereof, four distinct ratios of mainshaft rotation to output shaft rotation may be provided. Accordingly, auxiliary transmission section 16B is a three-layer auxiliary section of the combined range and splitter type providing four selectable speeds or drive ratios between the input (mainshaft 82) and output (output shaft 20) thereof. The main section 16A provides a reverse and three potentially selectable forward speeds. However, one of the selectable main section forward gear ratios, the low-speed gear ratios associated with mainshaft gear 110, is not utilized in the high range. Thus, transmission 16 is properly designated as a "(2+1)×(2×2)" type transmission providing nine or ten selectable forward speeds, depending upon the desirability and practicality of splitting the low gear ratio.

Splitter shifting of transmission 16 is accomplished responsive to initiation by a vehicle operator-actuated splitter button 52 or the like, usually a button located at the shift lever knob, while operation of the range clutch shifting assembly is an automatic response to movement of the gear shift lever between the central and rightwardmost legs of the shift pattern, as illustrated in FIG. 2. Alternatively, splitter shifting may be automated (see U.S. Pat. No. 5,435,212). Range shift devices of this general type are known in the prior art and may be seen by reference to aforementioned U.S. Pat. Nos. 3,429,202; 4,455,883; 4,561,325 and 4,663,725.

Although the present invention is illustrated in the embodiment of a compound transmission not having an intermediate wall, the present invention is equally applicable to transmissions of the type illustrated in aforementioned U.S. Pat. Nos. 4,754,665; 5,193,410 and 5,368,145.

In other manual transmissions, the splitter clutches are operated by two-position actuators and, thus, are provided with a relatively small backlash (i.e., about 0.008–0.012 inches backlash for a clutch having about a 3.6-inch pitch diameter) to prevent unduly harsh splitter shifting. Typically, with the above backlash and the usual engagement forces, at greater than about 60 RPM input shaft synchronous error, the clutch teeth would ratchet or "buzz" and clutch engagement would not occur.

As is known (see U.S. Pat. No. 5,052,535, the disclosure of which is incorporated herein by reference), allowable relative rotational speed at which the positive clutches will properly engaged (i.e., sufficient clutch tooth penetration will occur) is a directly proportional function of the total effective backlash in the clutch system. The maximum allowable asynchronous conditions at which clutch engagement is allowed is selected in view of the most harsh clutch engagement which is acceptable.

In change-gear transmissions utilizing the non-synchronized positive clutch structures, especially for heavy-duty vehicles, for a given total backlash (i.e., a given maximum allowably harsh clutch engagement), the range of asynchronous conditions at which the clutch members will engage is often narrower than desirable under certain conditions, making shifting more difficult.

According to the illustrated embodiment of the present invention, and as more fully described in aforementioned U.S. Pat. No. 5,651,292, the interengaging clutch teeth provided on splitter clutch 88 and on splitter gear 124 and splitter/range gear 126 are of a relatively large backlash (i.e., about 0.020–0.060 inches for a 3.6-inch pitch diameter clutch), which will assure that almost any attempted splitter shift under full force will be completed.

Figure 4:
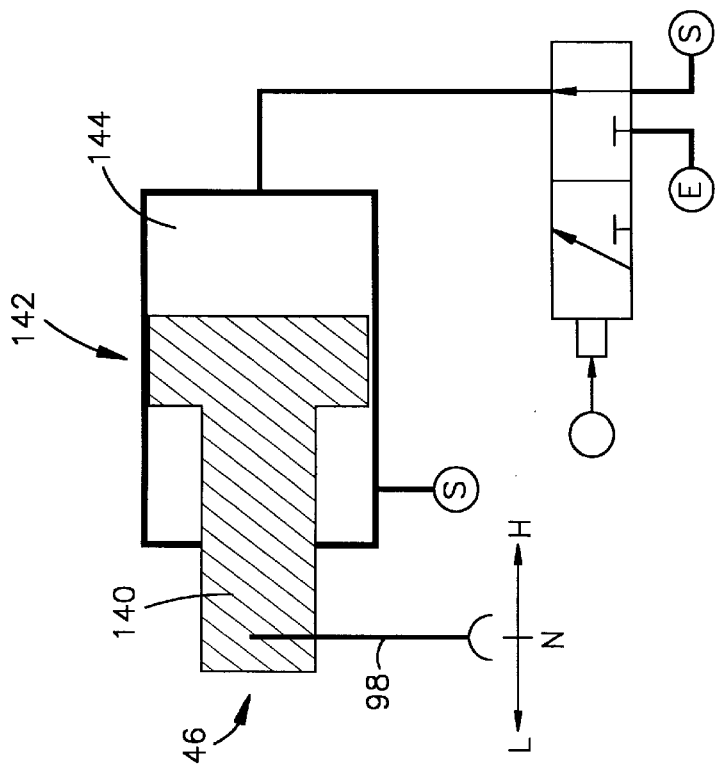
FIG. 4 is a schematic illustration of a three-position splitter actuator for use with the transmission system of FIG. 1.

The clutch 88 is moved by a shift fork 98 attached to the piston rod 140 of the piston actuator assembly 142 (see FIG. 4). Actuator assembly 142 may be a conventional three-position actuator (see U.S. Pat. No. 5,054,591, the disclosure of which is incorporated herein by reference) or an actuator of the type illustrated in U.S. Pat. No. 5,682,790 or No. 5,661,998 (the disclosures of which are incorporated herein by reference), wherein pulse width modulation of a selectively pressurized and exhausted chamber 144 may be used to achieve the three splitter positions (L, N, H) of the shift fork.

Preferably, the splitter clutch actuator 142 will be capable of applying a variable force, such as by pulse width modulation, of supply pressure. A force lesser than full force may be utilized when disengaging and/or when synchronous conditions cannot be verified.

The controller 48 is provided with logic rules under which, if the main section is engaged, a shift from splitter neutral into a selected target splitter ratio is initiated such that, under normal conditions, including proper operator fuel control, the synchronous error (which is equal to input shaft rotational speed minus the product of output shaft rotational speed and transmission target gear ratio) is expected to be equal to or less than a value selected to give smooth, high-quality shifts ((IS−(OS*GR))=ERROR≦REF). The timing is done in regard to sensed/expected shaft speeds, shaft acceleration/deceleration and actuator reaction times.

In certain situations, the logic rules will recognize operating conditions wherein the preferred synchronous window (i.e., IS=(OS*GR)±60 RPM) must be expanded to accomplish a splitter shift, even at the expense of shift quality. These situations, usually associated with upshifts, include if shifting attempted at low engine speeds wherein expected engine speed at shift completion will be undesirably low, if deceleration of the output shaft is relatively high (dOS/dt<REF), if the deceleration of the engine is relatively low (dES/dt>REF) and/or if the absolute value of the synchronous error is not approaching the normal value at an acceptable rate.

The position of the shift lever 31 or of the shifting mechanism 32 controlled thereby may be sensed by a position sensor device. Various positioning sensing assemblies are known in the prior art, with a preferred type illustrated in allowed U.S. Ser. No. 08/695,052, assigned to the assignee of this application, the disclosure of which is incorporated herein by reference.

Figure 5B:
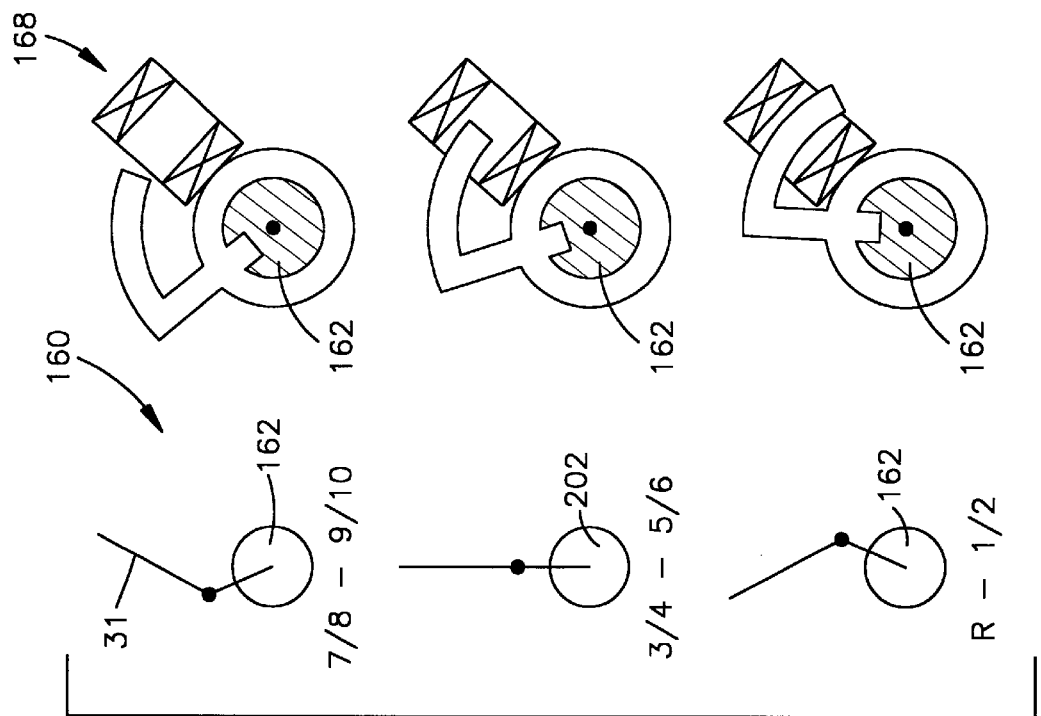
FIGS. 5A and 5B are schematic illustrations of a shift shaft position sensor mechanism for use in the system of FIG. 1.
Figure 5A:
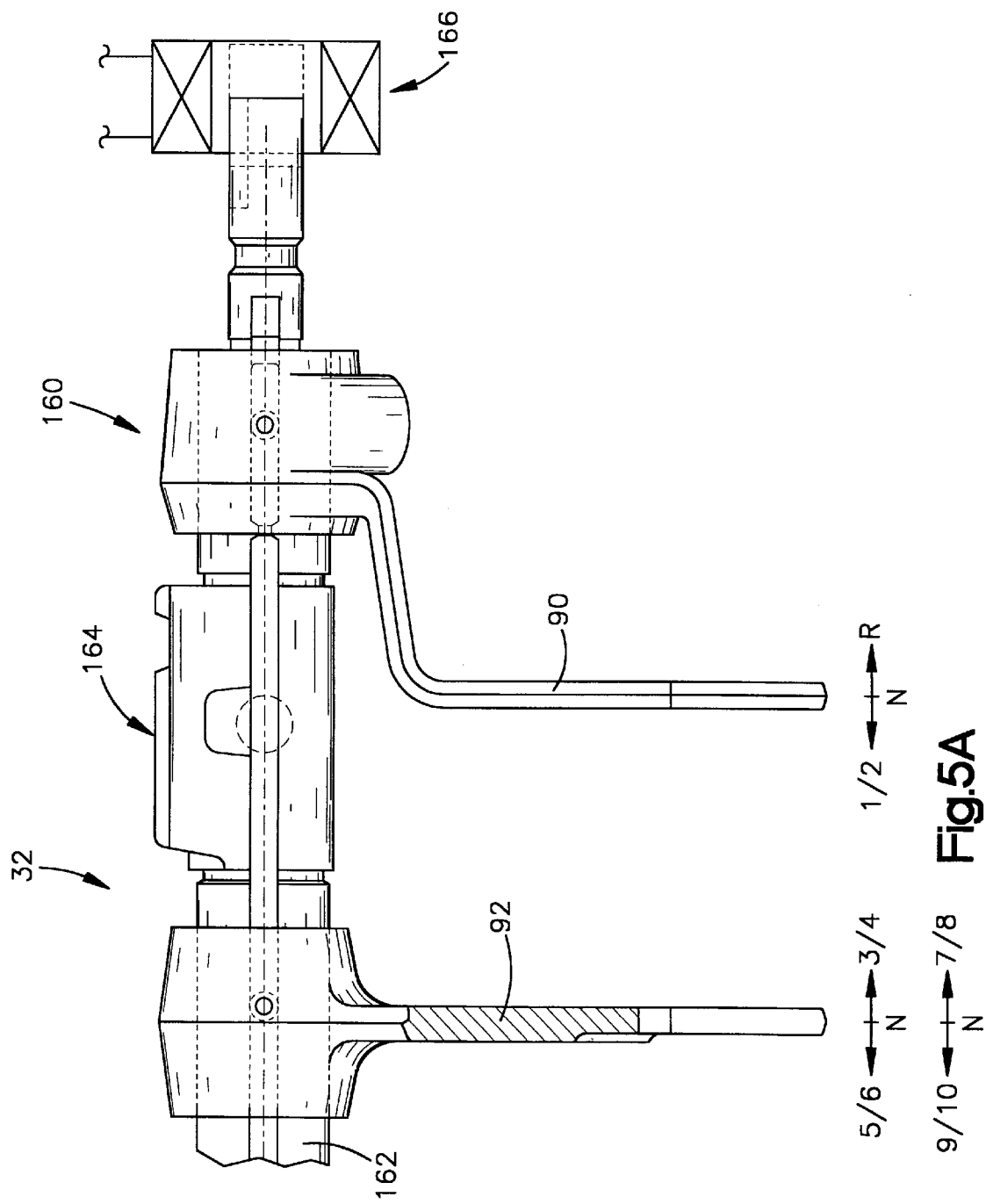
Figure 6:
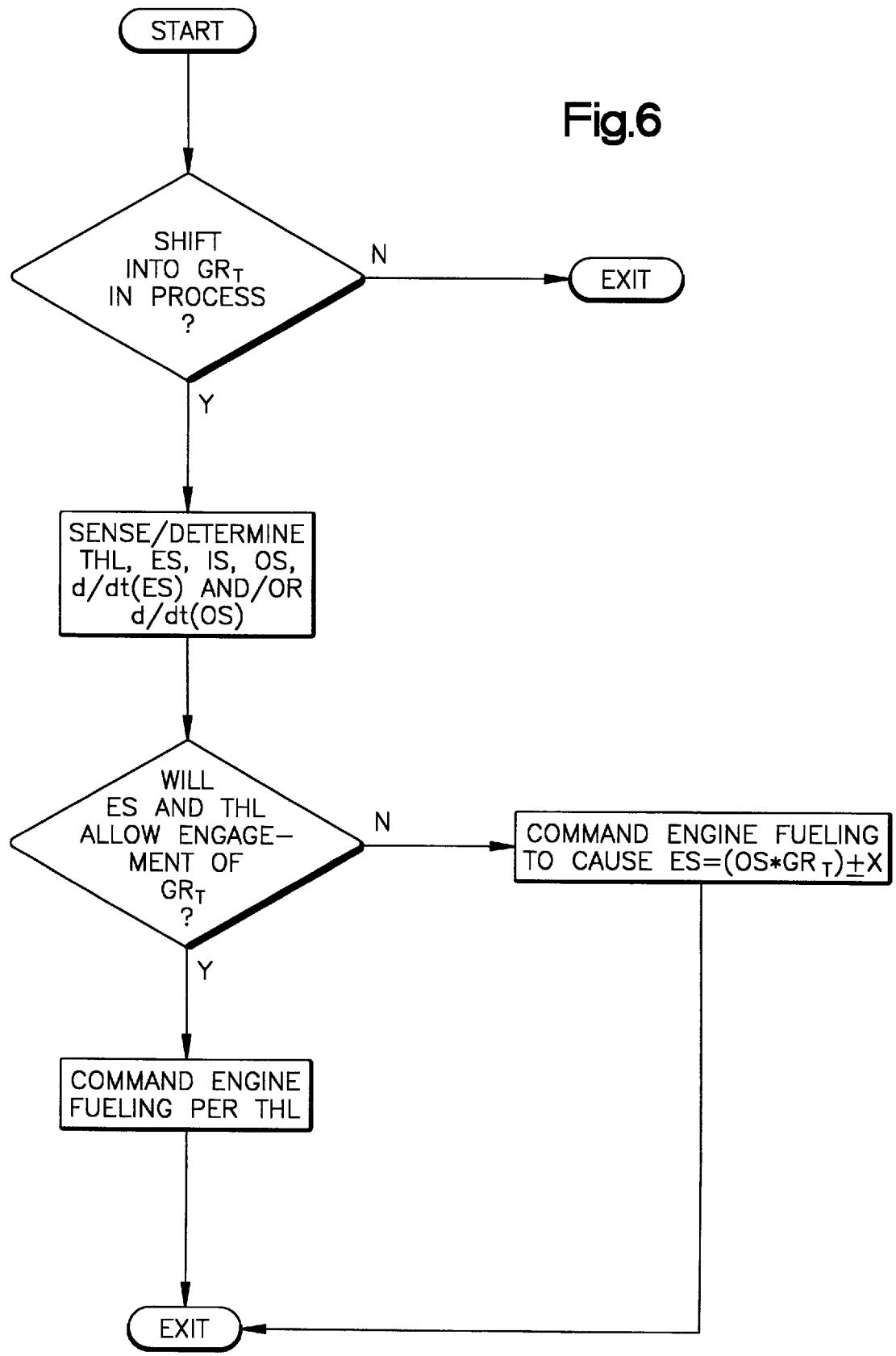
FIG. 6 is a schematic illustration, in flow chart format, of the control of the present invention.

Referring to FIGS. 5A and 5B, shifting mechanism 32 is illustrated as a single shift shaft device 160 having a shaft 162 which is rotatable in response to X—X movements of shift lever 31 and axially movable in response to Y—Y movements of shift lever 31. Mechanisms of this type are described in detail in aforementioned U.S. Pat. No. 4,920,815.

Shift shaft 162 carries the main section shift forks 90 and 92 for selective axial movement therewith and a shift block member 164 for receiving a shift finger or the like. A pair of coils 166 and 168 provide a pair of signals (collectively GR) indicative of the axial and rotational position of shaft 162 and, thus, of shift lever 31 relative to the shift pattern illustrated in FIG. 2. Preferably, the rate of change of position (dGR/dt) also may be determined and utilized to enhance shifting of the system 10.

By way of example, referring to FIG. 2, if shift lever position can be sensed, the need for a fixed switch or the like at point AR to sense a required initiation of a shift between low range and high range is eliminated. Further, as physical switches are no longer required, the shift pattern position at which a range shift will be commanded can be varied, such as to points 180, 182 or 184, to enhance system performance under various operating conditions.

If in first (1st) through fourth (4th), a shift into high range is unlikely and the auto range shift initiation point may be moved to position 184 (away from the expected shift lever path) to prevent inadvertent actuation of a range shift. If in sixth (6th) with a high engine speed, a shift into high range is likely and moving the auto range initiation point to position 180 will allow for a quicker initiation of a range shift.

According to the present invention, the operator is allowed to control engine fueling unless the current vehicle operating conditions indicate that his/her operation of the throttle pedal will not allow the jaw clutches associated with the current target ratio to engage. If operating conditions, including operator setting of the throttle pedal, indicate that the operator will complete a splitter shift into target ratio, including a relatively rough shift, the engine will be fueled in accordance with operator throttle setting. If not, during some or all shifts, automatic engine fueling may occur. If the splitter section does engage prior to the main section, as is preferred, the operator will remain in complete control of engine fueling to complete the shift by engaging the main section.

The state of engagement (i.e., engaged or neutral) of the main transmission section 16A is an important control parameter for system 10. By way of example, if main section neutral is sensed, the splitter may be commanded to a full force engagement, regardless of the existence or absence of synchronous conditions. Also, if the main section is engaged while the splitter is in neutral, the system will not cause splitter engagement until substantial synchronous is sensed and may then initiate automatic fuel control if required. Of course, it is important to prevent or minimize false determinations of main section neutral and/or engaged conditions.

Referring to FIG. 2, a first narrow band 202 and a second wider band 204 of vertical displacements from the bight portion 200 are utilized to determine if the main section is or is not in neutral. If the transmission main section is not confirmed as being in main section neutral, the neutral confirmation band will be the narrower band 202. This will assure that the main section 16A is truly in neutral before declaring a main section neutral condition. If the transmission main section 16A is confirmed as being in neutral, the neutral confirmation band will be the wider band 204. This assures that mere overshooting of neutral or raking of main section jaw clutches will not be incorrectly interpreted as a main section engaged condition.

Sensing the shift lever at point 206 will always be interpreted as main section neutral, and sensing the shift lever at point 208 will always be interpreted as main section engaged. However, if the shift lever is sensed at point 210, this will not cause a previous determination of a neutral or engaged condition to change.

Vehicle operating conditions other than or in addition to currently engaged or neutral condition of the main section 16A may be used to vary the width of the neutral sensing bands.

In the illustrated transmission system 10, the system controller 48 can determine the identity of the target gear ratio ($GR_T$) from the shift shaft position sensor 160 and the position of the splitter switch 52. The controller then determines if the main section or the splitter is engaged (assuming not a range shift) and what engine speed is needed to complete engagement of the target ratio ($GR_T$) under current vehicle speed (as represented by output shaft speed OS). If it appears that the operator's engine fueling demand (throttle position THL) will not prevent engagement of the target ratio, the engine controller 36 will continue to fuel the engine in accordance with the operator throttle setting. If, however, given current engine speed, rate of change of engine speed and/or rate of change of vehicle speed, continuing to fuel the engine in accordance with operator demand (THL) will prevent completion of jaw clutch engagement for engaging the target ratio, the controller will command that the engine be fueled in a manner to allow completion of the shift and the operator's throttle position setting will be ignored. Upon completion of the shift, a throttle recovery technique (see U.S. Pat. No. 4,493,228) will be used to return control of fueling to the driver/operator.

As indicated above, even the best pneumatic, electric, hydraulic and/or mechanical jaw clutch engagement systems can be defeated if the driver does not get the engine to the proper synchronous speed. If a driver reapplies fuel too early on an upshift (prior to the clutch engaging), the shift is missed because the application of fuel and subsequent engine speed increase drives the engine away from the desired synchronous speed, or if the engine deceleration is rapid, the clutch may not engage because the system passes through synchronous too quickly. If the driver does not apply enough fuel on the downshift to raise the engine to synchronous speed, the clutch does not engage, or if the driver applies too much fuel, the engine accelerates past the desired synchronous speed and the clutch does not engage.

The algorithm control of the present invention uses a number of inputs to determine if the driver is not responding in a manner that will allow the engaging jaw clutch associated with the target ratio to engage. When this condition is identified, the control (preferably through the SAE J-1939 communications link) overrides the driver's actions and automatically controls fueling the engine so the shift can be completed.

The control of the present invention has been designed to intervene only when the driver's throttle control actions are determined to interfere with completion of the ongoing shift.

By way of example, on upshifts, the system uses input shaft speed, output shaft speed and throttle pedal demand to determine if it should evoke automatic engine fuel control. On a downshift, the system uses a combination of throttle pedal demand, engine acceleration (dES/dt), output shaft speed and engine speed to determine if automatic engine fuel control should be invoked. Preferably, in downshifts, the control logic looks at acceleration rate of the vehicle (dOS/dt) and proximity to maximum engine speed to determine if automatic engine fuel control should be invoked. In range downshifts, automatic engine fuel control will occur if the driver engages the main section 16A well out of synchronous. If this occurs, automatic engine control is invoked immediately to insure that the range clutch engages.

In a preferred embodiment, the shift logic is timed so that the splitter normally will engage prior to the main section during a compound shift. If the main section is disengaged, the splitter will be caused to engage without regard for synchronous conditions. The ECU will take over fuel control from the operator only to complete a splitter shift when the main section is engaged (all splitter-only shifts and only those compound shifts wherein the driver happens to beat the splitter) and then only if the operator is doing a very poor job of fuel control. In this preferred embodiment, in a compound shift, if the splitter beats the operator, the operator is totally on his own as to fuel control for completing the shift by engaging the main section.

Accordingly, it may be seen that a new and improved engine fuel control is provided, which provides assisted shifting in the form of automatic fuel control only when necessary to allow a shift into a target gear ratio to be completed.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling a vehicular control unit-assisted, manually shifted transmission system during an operator attempt to engage a target gear ratio ($GR_T$), said transmission system comprising an operator-set fuel throttle demand device for providing a signal indicative of operator engine fueling demand (THL), a fuel-controlled engine, an engine controller for controlling the supply of fuel to the engine in response to command signals, said engine controller having at least one mode of operation wherein engine fueling is provided in accordance with said operator-set fuel throttle demand device and at least one mode of operation wherein engine fueling is provided to achieve a requested engine speed (ES) value, a mechanical change-gear transmission having an input shaft driven by said engine, an output shaft and defining a plurality of selectively engaged and disengaged gear ratios for providing various ratios of input shaft rotational speed to output shaft rotational speed (IS/OS), said gear ratios engaged by engaging at least a selected set of positive jaw clutch members, said control unit receiving input signals indicative of vehicle operating conditions including at least one of (i) throttle demand device setting (THL), (ii) engine rotational speed (ES), (iii) input shaft rotational speed (IS) and (iv) output shaft rotational speed (OS) and processing same according to logic rules to issue command signals to at least said engine controller, said method comprising the steps of:

determining if the operator is attempting to engage a specific target gear ratio ($GR_T$);

determining if current engine speed and throttle demand device setting will prevent engagement of said target gear ratio;

if current engine speed and throttle demand device setting will not prevent engagement of said target gear ratio, commanding the engine controller to fuel said engine in accordance with said operator-set fuel throttle demand device; and if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

2. The method of claim 1 wherein said control unit is microprocessor-based.

3. The method of claim 1 wherein said requested engine speed value is determined as a function of the numerical values of the target gear ratio and of output shaft rotational speed.

4. The method of claim 1 wherein determining if current engine speed and throttle demand device setting will prevent engagement of said target gear ratio is a function of three or more of engine speed, rate of change of engine speed, output shaft speed, rate of change of output shaft speed, and throttle demand device setting.

5. The method of claim 1 wherein said transmission is a compound transmission having a main transmission section connected in series with an auxiliary transmission section, said main transmission section shifted by an operator-manipulated shift lever.

6. The method of claim 1 wherein said transmission comprises a main transmission section and a splitter section, said engine controller commanded to fuel said engine to achieve a requested engine speed determined to allow engagement of said target ratio only if the main section is engaged and the splitter section is not engaged.

7. A vehicular control unit-assisted, manually shifted transmission system comprising an operator-set fuel throttle demand device for providing a signal indicative of operator engine fueling demand (THL), a fuel-controlled engine, an engine controller for controlling the supply of fuel to the engine in response to command signals, said engine controller having at least one mode of operation wherein engine fueling is provided in accordance with said operator-set fuel throttle demand device and at least one mode of operation wherein engine fueling is provided to achieve a requested engine speed (ES) value, a mechanical change-gear transmission having an input shaft driven by said engine, an output shaft and defining a plurality of selectively engaged and disengaged gear ratios for providing various ratios of input shaft rotational speed to output shaft rotational speed, said gear ratios engaged by engaging at least a selected set of positive jaw clutch members, said control unit receiving input signals indicative of vehicle operating conditions including at least one of (i) throttle demand device setting (THL), (ii) engine rotational speed (ES), (iii) input shaft rotational speed (IS) and (iv) output shaft rotational speed (OS) and processing same according to logic rules to issue command signals to at least said engine controller, said system comprising:

means for determining if the operator is attempting to engage a specific target gear ratio ($GR_T$);

means for determining if current engine speed and throttle demand device setting will prevent engagement of said target gear ratio;

means effective, if current engine speed and throttle demand device setting will not prevent engagement of said target gear ratio, for commanding the engine controller to fuel said engine in accordance with said operator-set fuel throttle demand device; and means effective, if current engine speed and throttle demand device setting will prevent engagement of said target gear ratio, for commanding said engine controller to cease fueling said engine in accordance with said operator-set fuel throttle demand device and instead to fuel said engine to achieve a requested engine speed value determined to allow engagement of said target ratio.

8. The system of claim 7 wherein said control unit is microprocessor based.

9. The system of claim 7 wherein said requested engine speed value is determined as a function of the numerical values of the target gear ratio and of output shaft rotational speed.

10. The system of claim 7 wherein determining if current engine speed and throttle demand device setting will prevent engagement of said target gear ratio is a function of three or more of engine speed, rate of change of engine speed, output shaft speed, rate of change of output shaft speed, and throttle demand device setting.

11. The system of claim 7 therein said transmission is a compound transmission having a main transmission section connected in series with an auxiliary transmission section, said main transmission section shifted by an operator-manipulated shift lever.

12. The system of claim 7 wherein said transmission comprises a main transmission section and a splitter section, said engine controller commanded to fuel said engine to achieve a requested engine speed determined to allow engagement of said target ratio only if the main section is engaged and the splitter section is not engaged.

13. A computer program product for controlling a vehicular control unit-assisted, manually shifted transmission system during an operator attempt to engage a target gear ratio ($GR_T$), said transmission system comprising an operator-set fuel throttle demand device for providing a signal indicative of operator engine fueling demand (THL), a fuel-controlled engine, an engine controller for controlling the supply of fuel to the engine in response to command signals, said engine controller having at least one mode of operation wherein engine fueling is provided in accordance with said operator-set fuel throttle demand device and at least one mode of operation wherein engine fueling is provided to achieve a requested engine speed (ES) value, a mechanical change-gear transmission having an input shaft driven by said engine, an output shaft and defining a plurality of selectively engaged and disengaged gear ratios for providing various ratios of input shaft rotational speed to output shaft rotational speed, said gear ratios engaged by engaging at least a selected set of positive jaw clutch members, said control unit receiving input signals indicative of vehicle operating conditions including at least one of (i) throttle demand device setting (THL), (ii) engine rotational speed (ES), (iii) input shaft rotational speed (IS) and (iv) output shaft rotational speed (OS) and processing same according to logic rule codes to issue command signals to at least said engine controller, said product having logic rule codes for:

determining if the operator is attempting to engage a specific target gear ratio ($GR_T$);

determining if current engine speed and throttle demand device setting will prevent engagement of said target gear ratio;

if current engine speed and throttle demand device setting will not prevent engagement of said target gear ratio, commanding the engine controller to fuel said engine in accordance with said operator-set fuel throttle demand device; and if current engine speed and throttle demand device setting will prevent engagement of said target gear ratio, commanding said engine controller to cease fueling said engine in accordance with said operator-set fuel throttle demand device and instead to fuel said engine to achieve a requested engine speed value determined to allow engagement of said target ratio.

14. The product of claim 13 wherein said control unit is microprocessor based.

15. The product of claim 13 wherein said requested engine speed value is determined as a function of the numerical values of the target gear ratio and of output shaft rotational speed.

16. The product of claim 13 wherein determining if current engine speed and throttle demand device setting will prevent engagement of said target gear ratio is a function of three or more of engine speed, rate of change of engine speed, output shaft speed, rate of change of output shaft speed, and throttle demand device setting.

17. The product of claim 13 wherein said transmission is a compound transmission having a main transmission section connected in series with an auxiliary transmission section, said main transmission section shifted by an operator-manipulated shift lever.

18. The product of claim 13 wherein said transmission comprises a main transmission section and a splitter section, said engine controller commanded to fuel said engine to achieve a requested engine speed determined to allow engagement of said target ratio only if the main section is engaged and the splitter section is not engaged.

* * * * *